Aug. 9, 1955
F. E. STUART
2,715,099
WALKING BEAM FLOCCULATOR-AERATOR
Filed Aug. 9, 1950
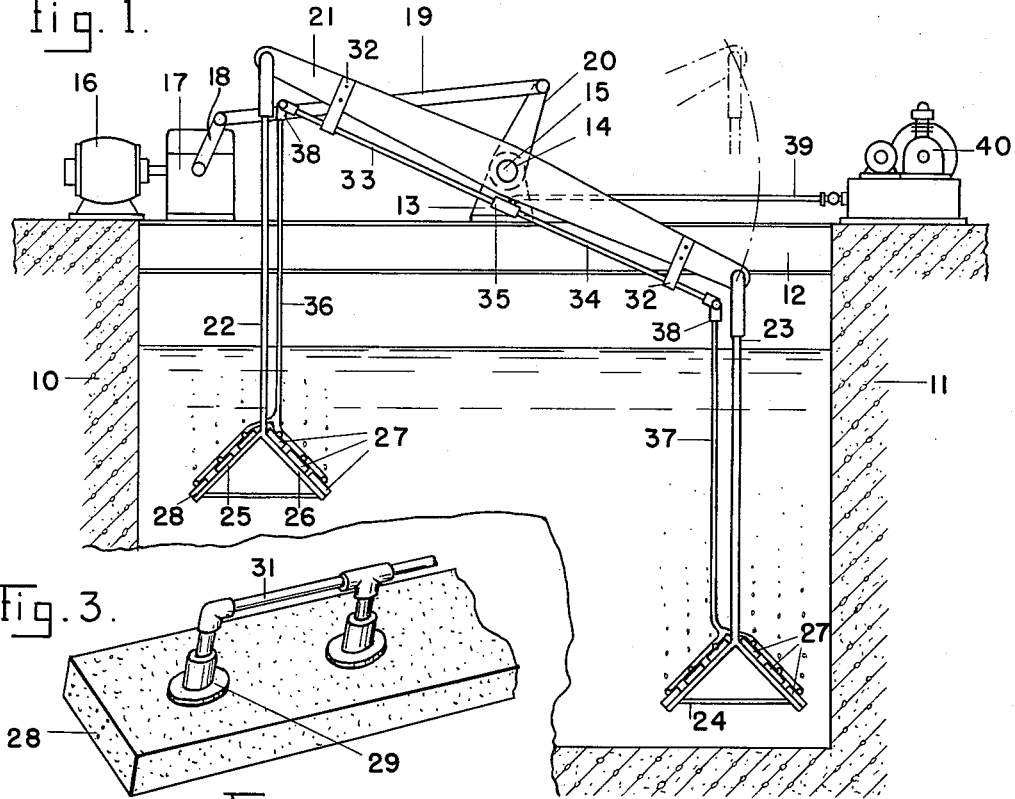
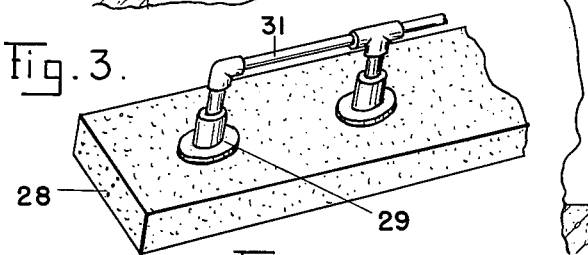
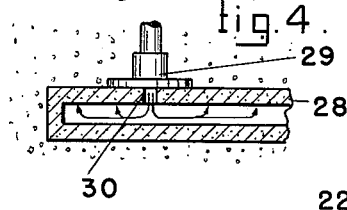
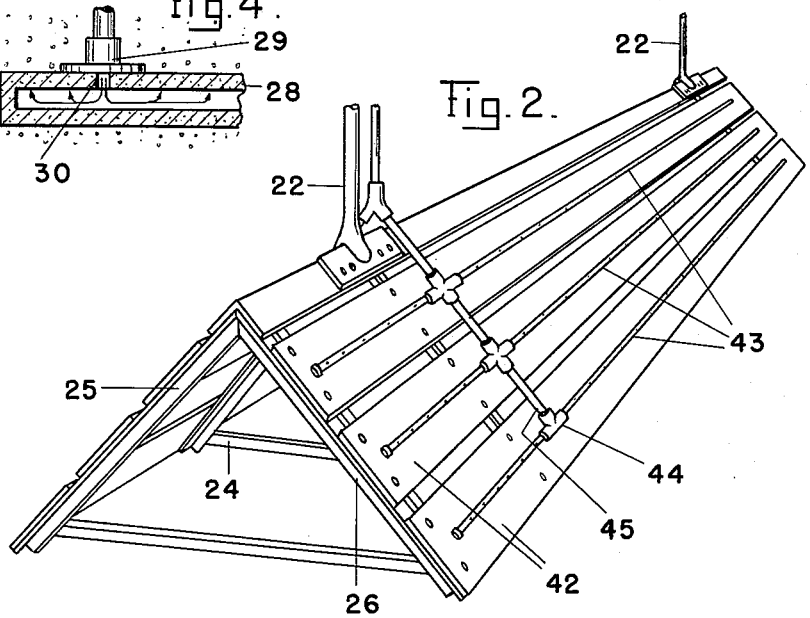
INVENTOR
FRED. E. STUART
By Toulmin & Toulmin
ATTORNEYS.

United States Patent Office 2,715,099
Patented Aug. 9, 1955

2,715,099

WALKING BEAM FLOCCULATOR-AERATOR

Fred E. Stuart, Baltimore, Md., assignor to Stuart Corporation, Baltimore, Md., a corporation of Maryland Application August 9, 1950, Serial No. 178,423

2 Claims. (Cl. 210—26)

This invention relates to the purification of water and aqueous waste solutions. More particularly, it relates to the removal of solids and oxidizable material. Still more particularly, it relates to an improved method of aerating aqueous material in settling basins and apparatus therefor. This application is related to Serial No. 604,489, filed July 11, 1945 (now Patent Number 2,596,082), and having the same inventor.

In the treatment of water in filter plants it has been common practice to tie together units having a mixing or flocculation basin within which the flow of liquid is directed by means of a series of baffles, with settling basins operated in series.

These units vary in size from a rated capacity of a few thousand gallons per day to five hundred thousand or more gallons per day. The results obtained with these settling basins fluctuate markedly with the condition of the feed water.

In addition, where aeration has been utilized to effect flocculation independent of or in conjunction with chemical treatment as, for example, with raw sewage, prior to preliminary settling, the installations have required permanent under water piping systems operating at a high enough air pressure to maintain suspension and circulation of solids in the basins.

It is an object of the present invention to provide a method of treating aqueous material to obtain uniform turbidity and like properties desired for treated water regardless of the conditions of the feed water.

It is another object of the present invention to provide a method of aerating the liquid in flocculation basins and the like which is more economical since it operates at low gas pressures.

It is still another object of the present invention to provide a method which eliminates fixed diffusers and associated piping which clutter the bottom of flocculation basins.

It is also an object of this invention to provide a method wherein mixing is so thorough that channeling or short-circuiting is eliminated.

It is a further object of this invention to provide a method wherein reduced quantities of coagulants may be used giving rise to lower costs.

It is a still further object of the present invention to provide aerating apparatus which is readily adaptable to existing basins as well as to new installations.

It is still another object of this invention to provide aerating apparatus for which no stuffing boxes are needed.

It is another object of this invention to provide aerating apparatus wherein contacting movable metal to metal or bearing parts are positioned so that they are not in the water being treated.

It is also an object of this invention to provide aerating apparatus which is of simplified construction and has a low operational cost.

These and other objects and advantages will become apparent as the description of this invention proceeds.

Briefly, the method comprises introducing gaseous medium into a liquid medium below the surface thereof and causing distribution of the gaseous medium discharged from a multiplicity of outlets deployed as spaced groups positioned transverse to the liquid flow, through vertical reciprocation of the outlets, said outlets being adapted for movement of one group in a direction opposite to the direction of movement of a companion group.

Reciprocation of two parallel spaced groups of gas outlets in which the diffuser units are themselves spaced provides not only a multiplicity of gas streams but also a violent turbulence dispersing the gas streams as a plurality of bubbles which are carried in the liquid for a time sufficient for reaction. This turbulent mixing creates diverse bubble paths and does not allow the gas merely to percolate upwards through the liquid and escape to the atmosphere in well defined channels.

The gas being introduced below the surface of the liquid may be oxygen, oxygen mixed with inert gas, or it may merely be compressed air. Since the circulation of solids is maintained by turbulence created by the reciprocating unit, the gas need merely be under a pressure in the range of approximately 2 to 10 pounds gas pressure, although pressures outside this range may be used.

The method of this invention will be more readily understood by reference to the accompanying drawings in which one apparatus is shown as illustrative and by which the process may be carried out. The apparatus itself constitutes a new and useful invention which is covered hereby.

Referring to the drawings:

Figure 1 is a schematic side elevational view of a flocculation basin having suspended therein the flocculator-aerator of this invention;

Figure 2 is a perspective view of a flocculator-aerator having multiple vent piping for gas distribution;

Figure 3 is a perspective view of a fragment of a porous plate which may be mounted on the inverted V framework; and Figure 4 is a sectional view through a porous plate of the type shown in Figure 3.

Briefly, the apparatus comprises walking beam or rocking arm members from which are suspended V-shaped supports having the apex directed upwardly. On each of the sides or legs of the V-shaped supports are mounted one or more plates, at least one of which is provided with means for diffusing gas.

The diffuser means are preferably plates spaced from each other when mounted on the sides of the supports. This spaced relationship allows liquid flow between the plates which upon reciprocation of the units creates turbulence agitating the entire basin contents.

In the preferred embodiment illustrated in the drawings, the numerals 10 and 11 indicate the end walls of a flocculation basin. Suspended between walls 10 and 11 are support beams 12. Support beams 12 have positioned on top thereof mountings 13 for bearings 14. Enclosed in bearings 14 is a shaft 15. Shaft 15 is connected to a source of power 16 such as an electric motor through a speed reduction or gear system 17 such as a Varidrive system and the crank arm 18 which is pivotably linked by connecting rod 19 to lever 20 the latter being secured to the shaft 15.

Mounted on shaft 15 are walking beams 21 only one of which is illustrated. From the opposite ends of beams 21 are pivotably suspended support arms 22 and 23. Support arms 22 have attached to their lower extremity a V-shaped framework 24 connection being made at the apex thereof by suitable means such as bolting or welding.

Framework 24 has legs 25 and 26 to which are secured in spaced relationship plates 27. As illustrated in Figures 1, 3 and 4 the plates are porous members 28 such as hollow carborundum plates. Ceramic and porcelain plates may also be used if properly supported so as not to be subjected to tensional strains.

Secured to the plates 28 at spaced intervals are pipe connections 29. Connections 29 communicate with the hollow interior of plates 28 through ports 30. Connections 29 are joined to one another by suitable tubular members 31 to form an air delivery unit having the inlets spaced along the longitudinal axis to provide uniform interior pressure within the porous diffuser plate.

From the ends of support arms 23 are suspended a V-shaped framework similar to framework 24 so that identical units are suspended from opposite ends of the walking beams 21.

Adjacent the ends of walking beams 21 are secured depending brackets 32. Brackets 32 support tubular members 33 and 34 joined at the center by a suitable pipe fixture 35. Tubular members 33 and 34 communicate with tubular connectors 36 and 37 through suitable means 38 allowing change of angle between members 33 and 36 and members 34 and 37, as for example, a flexible noncollapsible tube or a rotary coupling or equivalent means.

Suitable connection of the air delivery system to a compressor 40 is made through a tubular member 39 which may be a flexable hose or rigid tubing secured, for example, by a rotary coupling to the fixture 35.

In Figure 2 there is illustrated another embodiment of the V-shaped member which in addition to supporting the aerating system provides the liquid flow creating turbulence.

In this embodiment the framework legs 25 and 26 support spaced plates 42 of suitable construction material such as silicon bronze, for example, sold under the trade name of Herculoy or Everdur.

Secured to the plates 42 as supports are the multiple vent tubular members 43 which may be of metal such as copper or non-metallic tubular material such as porous carborundum and the like. The tubular members 43 are interconnected by suitable fixtures 44 and piping 45.

In the operation of this equipment in a water system for municipal purposes, the water inlet is usually through venturi tubes which meter the water. Alum, or alum and lime, or alum and soda ash are added at this stage in quantities depending upon the alkalinity of the water and other conditions specific to the particular feed water.

Aluminum hydroxide formed as a result of adding alum is intimately contacted with the water and then allowed to settle in the coagulation or flocculation basin, carrying down with it most of the suspended matter and an appreciable portion of the bacteria.

Operation of the walking beams at a rate of, for example, 3 to 8 strokes per minute, creates the agitation for intimately contacting the alum with large quantities of the water.

Air is delivered to the porous plates attached to the V-shaped supports suspended from the walking beams at a pressure preferably in the range of 5 to 10 pounds p. s. i. gage.

When the equipment is used for example in an activated sludge plant, the material is handled as follows:

Raw sewage passes through grit chambers and then through fine screens to a mixing channel. In the mixing channel a recycle stream of conditioned sludge joins the raw sewage to form a mixed sewage stream.

Mixed sewage flows to open tanks usually 15 feet in depth and the length depending upon the quantity of material being treated. In each tank is suspended the reciprocable flocculator-aerator units.

After a predetermined number of hours of mixing and aeration, the charge is delivered to a sedimentation tank in which there is a Dorr classifier. The clear slightly colored effluent or outfall is sent to a diluting stream or lake while the sludge is dewatered for use as fertilizer.

In the water system, the superiority of the method utilizing the walking beam flocculator-aerator is evidenced by the saving permitted by, for example, a shift from lime to soda ash as an auxiliary chemical in the coagulation step and the reduced quantity of coagulants required for a given water capacity.

It is further evidenced by the increased capacity without change in size of the settling basins which can be attained while maintaining the turbidity to an average in the range of approximately 1.5 to 4 p. p. m., despite raw water turbidity conditions varying in the range of approximately 7 to 50 p. p. m., with turbidity on occasion reaching as high as 1000 p. p. m.

The superiority in the activated sludge system is evidenced by a shorter aeration period required and the smaller compressor unit which can be used, inasmuch as high pressure and large volume of air are no longer needed to circulate and suspend the solids.

It will be understood that this invention is susceptible to modification in order to adopt it to different usages and conditions and, accordingly, it is desired to comprehend such modifications within this invention as may fall within the scope of the appended claims.

I claim:

1. In a mechanism for the aeration of liquid in a flocculation basin, the said mechanism having a rocker arm rotatably supported by a shaft mounted atop said basin and a V-shaped framework with the apex thereof directed upwardly suspended from each end of said rocker arm and vertically reciprocable therewith, the improvement comprising a plurality of metal supporting plates mounted on the upper faces of each side of said V-shaped framework, said plates on each side having spacings therebetween extending through said framework, a plurality of multiple vent tubular units mounted on the upper faces of said plates on both sides of said V-shaped framework, and conduit means extending downwardly into the basin connecting the interior of said tubular units to a source of compressed air so that upon rotation of said rocker arm air bubble streams are dispersed from said tubular units during vertical reciprocating movement of said framework to simultaneously aerate the liquid and cause flocculation of solid matter therein.

2. In a mechanism for the aeration of liquid in a flocculation basin, the said mechanism having a rocker arm rotatably supported by a shaft mounted atop said basin and a V-shaped framework with the apex thereof directed upwardly suspended from each end of said rocker arm and vertically reciprocable therewith with said framework having a plurality of spaced metal supporting plates on the uper faces of each side of said V-shaped framework, means mounted on said metal supporting plates for simultaneously aerating the liquid and flocculating the solid matter therein upon vertical reciprocation of the framework, and means entering the basin from above to convey air to said last-mentioned means.

References Cited in the file of this patent

UNITED STATES PATENTS

| | | |
|---|---|---|
| 399,610 | Goss | Mar. 12, 1889 |
| 758,367 | Joseph | Apr. 26, 1904 |
| 950,999 | Erlwein et al. | Mar. 1, 1910 |
| 1,893,623 | Imhoff | Jan. 10, 1933 |
| 1,985,854 | Downes | Dec. 25, 1934 |
| 2,023,924 | Hautz | Dec. 10, 1935 |
| 2,036,280 | Knight | Apr. 7, 1936 |
| 2,166,017 | Nagel | July 11, 1939 |
| 2,499,816 | Carter, Jr. | Mar. 7, 1950 |
| 2,596,082 | Stuart | May 6, 1952 |